Feb. 12, 1952 — I. POLITZER — 2,585,586
BOOK DISPLAY DEVICE
Filed July 21, 1949 — 3 Sheets-Sheet 1

INVENTOR.
IRVING POLITZER
BY
ATTORNEY

Feb. 12, 1952   I. POLITZER   2,585,586
BOOK DISPLAY DEVICE
Filed July 21, 1949   3 Sheets-Sheet 2
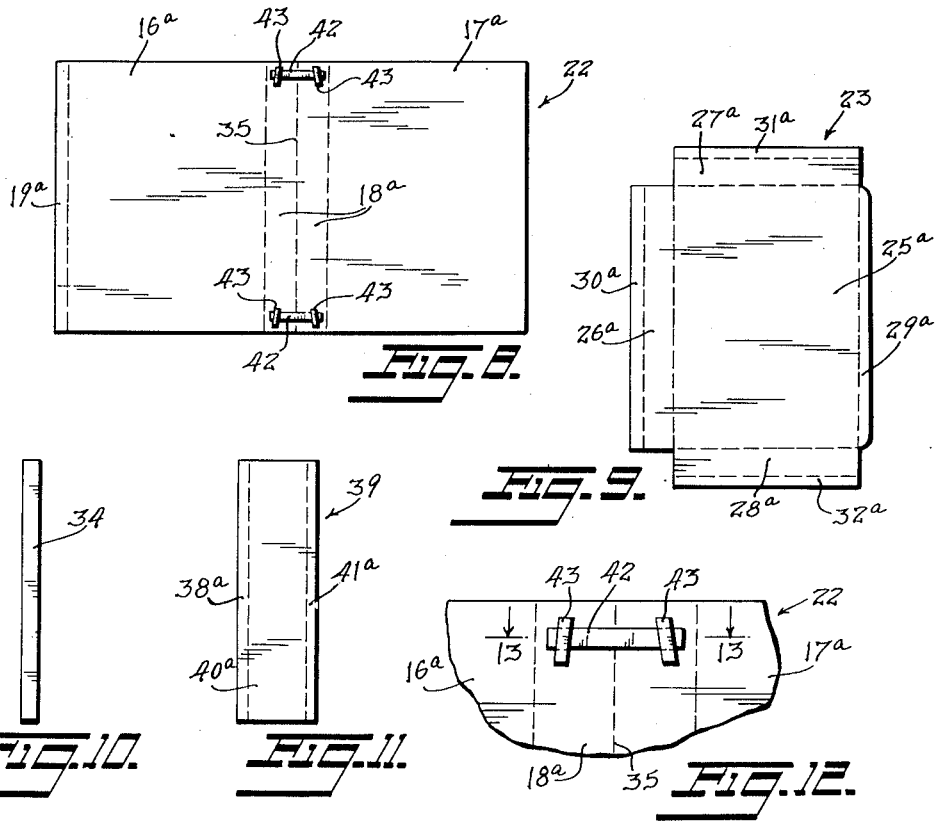
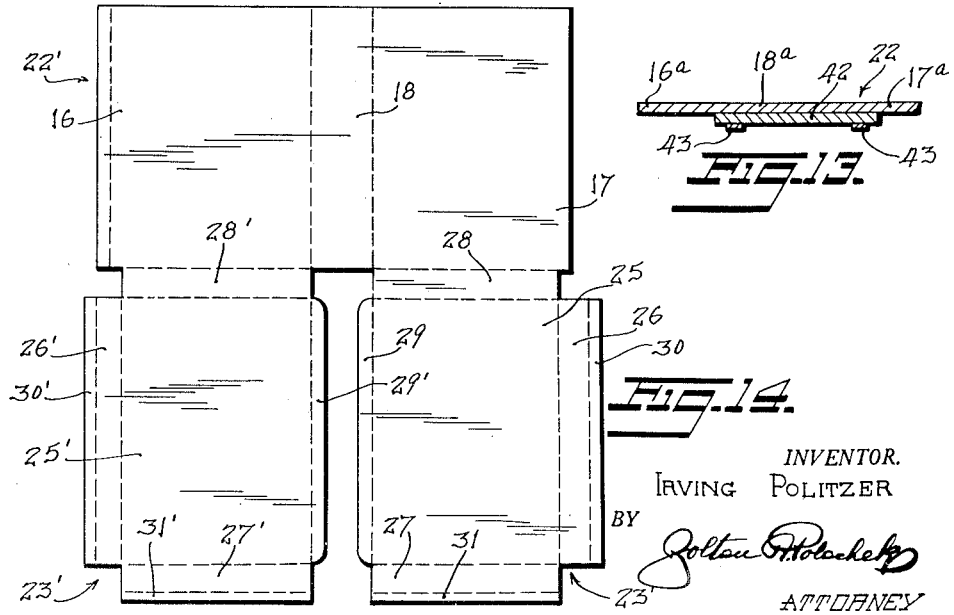
INVENTOR.
IRVING POLITZER
BY
ATTORNEY Feb. 12, 1952     I. POLITZER     2,585,586
BOOK DISPLAY DEVICE Filed July 21, 1949     3 Sheets-Sheet 3

INVENTOR.
IRVING POLITZER
BY
ATTORNEY

Patented Feb. 12, 1952

2,585,586

UNITED STATES PATENT OFFICE 2,585,586

BOOK DISPLAY DEVICE

Irving Politzer, New York, N. Y.

Application July 21, 1949, Serial No. 106,069

3 Claims. (Cl. 40—126)

This invention relates to new and useful improvements in display devices of the kind to be folded up from cardboard or the like and then set up in store windows, on display counters and at similar public attention attracting places for advertising a product, and, more particularly, the aim is to provide a novel and valuable such display device which is especially adapted for use in connection with an advertising campaign in regard to a book shortly to be published or recently published.

According to the invention, a display device is proposed which may provide, at relatively negligible cost, a greatly enlarged or giant replica of a book as actually manufactured, in regard to such details, for example, as the texture and coloration or colorations and/or design or designs on the cover and/or cover jacket, page-edge gilding or coloring if any, the relative thickness of the page or leaves-stack, the relative length and width dimensions of the page-stack and of the front and back boards of the cover, and so on.

According to the invention as carried out in the connection just above indicated, another feature thereof is that, while the display device may be packed or stored in folded condition, for facility in handling and for saving space and transportation charges, the said device, when to be set up at the place of display, may be then quickly and easily transformed to become an abnormally large replica of the book.

Furthermore, the device when thus expanded may be rested by its own weight on a suitable support in any selected one of a plurality of dispositions and arrangements; for instance, with the back-binding of its cover, or the free long edges of the cover-boards, more facing an observer than otherwise, as in three-quarter perspective, and in either case, with the book ostensibly in fully closed or partly open condition.

With the book in partly open condition, the portions of the sheet material of which the device is made may be imprinted or otherwise inscribed to show two successive page numbers, to reproduce the type employed in the printing of the actual book, perhaps illustrations as used therein, and in general the typical format of the book, all on a suitably enlarged scale. Also, wholly or partially at said portions of sheet material, advertising matter in praise of the book may be included.

Still another advantage of the invention is that while the book display device may comprise chiefly merely three main blanks, and then with two of such blanks identical, it may also comprise chiefly merely a single larger blank; and always, due to the essentially substantially rectangular outline of these main blanks, with such a minimization of waste sheet material as to be an important factor in the relatively low cost of manufacture of the device.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figs. 8 and 9 taken together illustrate the aforesaid three main blanks, spread flat; in which connection it is explained that in the case of each device the blank of Fig. 10 is used in duplicate, although, with one such blank folded in certain directions at the score lines desirably present, the other is folded in opposite directions as to each of said score lines.

Figs. 10 and 11 respectively illustrate two further blanks for use in forming the book display device of the present invention.

Fig. 12 is an enlarged fragmentary elevational detail view, for showing more clearly a feature illustrated in Fig. 8 and which may be included in the new device where the said spine of the book-cover is desired to be laterally arched.

Fig. 13 is a section taken on the line 13—13 of Fig. 12.

Fig. 14 illustrates, spread flat, a single main blank which may be substituted, as already stated, for the three main blanks depicted in Figs. 8 and 9.

Figure 15:
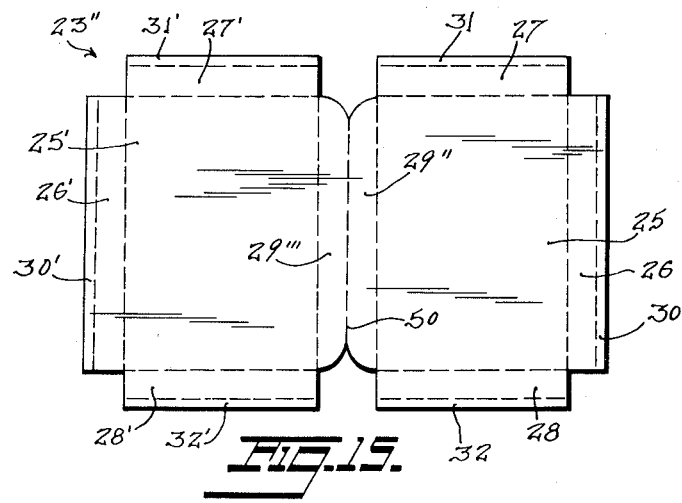

Fig. 15 is a plan view of the single blank, per se, which can be used to form the two hollow structures.

Referring now to the drawings more in detail, and first to Figs. 1 to 11, the book display device, as completed and erected, comprises, it will be noted, elements which may faithfully reproduce and hence perfectly simulate the usually visible parts of an actual book, to wit, the cover, a front board for the cover, a rear board for the cover, the back-binding or spine of the cover integral with the structure including said boards, and the pile or stack of book leaves.

Such cover as a whole is designated 15. Said front and back cover-boards and the said spine are respectively designated 16, 17 and 18. A strip element 19, later to be further mentioned, will be noted in Figs. 1, 2 and 6. The simulated leaf-pile is made up partially of a hollow structure 20 and partially of a hollow structure 21.

The cover 15 is folded up from a blank 22, the latter desirably having the score lines indicated in Fig. 8 to aid in folding the blank 22 to establish in variously angularly offset relations sections 16a, 17a, 18a and 19a for constituting, respectively, the front and back cover-boards, the spine of the cover and the aforesaid strip element as respectively marked as above 16, 17, 18 and 19. In Fig. 8 the blank 22 is seen at its side opposite to its side which is exposed at the exterior of the display device when erected.

The hollow structure 20 is folded up from a blank 23, the same desirably having score lines as indicated in Fig. 9 to aid in folding the blank 23 to establish in variously angularly offset relations sections 25a, 26a, 27a, 28a, 29a, 30a, 31a and 32a; these sections for constituting, respectively, the wall elements of the erected display device respectively marked 25 26, 27, 28, 29, 30, 31 and 32 in Figs. 1–6.

With regard to the structure 21, this is folded up as already stated from a blank identical with the blank 23, but with the folds reversed; and the subdivisions of the last-referred to blank, corresponding respectively to the wall elements of the erected display device, are respectively marked 25', 26', 27', 28', 29', 30', 31' and 32' in Figs. 1–6.

In preparing the book display device for storage in its collapsed condition, and in readiness at any time thereafter to be transformed into erected condition, a suitable adhesive is desirably used to make certain permanent interconnections as between different blanks. By the use say of such an adhesive, the element 30 is indirectly secured to the inside of the cover-board 17, and at the location indicated—that is, said element 30 is thus secured to a strip member 34, with the latter along a lengthwise margin thereof secured to said cover-board 17. Also, the element 30' is secured to the inside of the cover-board 16 at the location indicated; thus hingedly mounting the aforesaid blank identical with the blank 23 to the cover-board 16. Also, the flaps 29 and 29' are secured together in face to face relation as shown perhaps best in Fig. 6.

As a final result, the three main blanks are hingedly connected together in such manner that, with the spine 18 of the cover 15 readily foldable centrally longitudinally thereof, as by the aid of a score line such as indicated at 35 in Fig. 8, the entire device may be collapsed to extreme flatness, for storage, handling and transportation.

Figure 7:
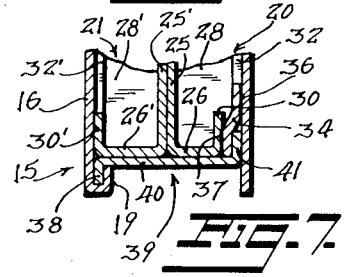
Fig. 7 is a further enlarged fragmentary detail section, this showing the parts of Fig. 6 rearranged to condition the display device to reproduce a fully closed book.

The said securements, of the strip member 34 to the inside of the cover-board 17, and of the element 30 to said strip, are indicated in Fig. 7 respectively at 36 and 37.

Figure 5:
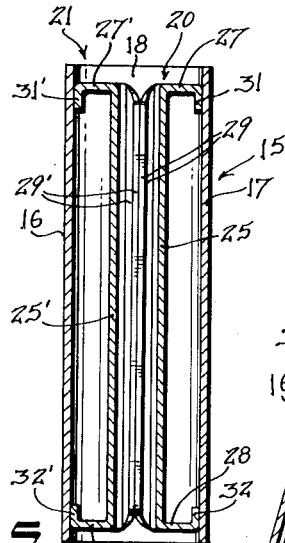
Fig. 5 is an enlarged vertical section taken on the line 5—5 of Fig. 2.

In order to set up the display device as so far structurally described, it is merely necessary, as explained in the sentence following, to expand the portions of the device afforded by the blank 23 and the aforesaid duplicate thereof, thereby to have the effect of causing substantial disappearance of the fold previously existent at said core line 35 incidental to the now occurring restoration of the spine 18 of the book cover to general angularly offset relation to the two cover boards. That is, the elements 27, 27', 31 and 31' are bent to arrange them as best shown in Fig. 5, and the elements 28, 28', 32 and 32' are bent also as best shown in Fig. 5. Thus, the book display device will be established, with the two hollow structures 20 and 21 present as a consequence of, respectively, the two groups of bendings just described; the device now being conditioned for arrangement as shown in any of Figs. 1–4—so far as are concerned the parts so far described in detail.

Figure 6:
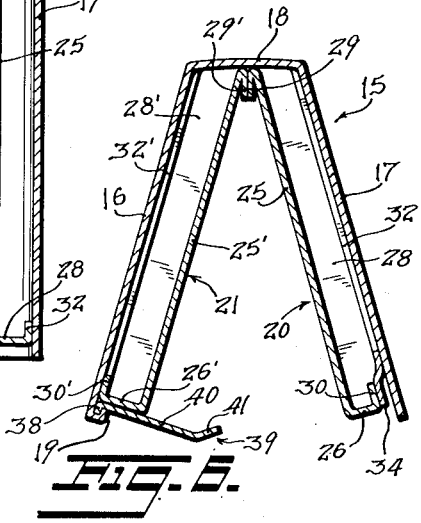
Fig. 6 is an enlarged horizontal section taken on the line 6—6 of Fig. 2.

However, reverting now to the hereinabove mentioned strip element 19, this, as will be observed from Fig. 8 when compared with the other views, is contributed by the terminal strip-like longitudinal subdivision 19a or the blank 22. This subdivision is folded over as shown in Figs. 2, 6 and 7, to provide a pocket for receiving and anchoring therein, as by the aid of a suitable adhesive, a strip element 38 provided by a longitudinal marginal subdivision 38a of a strip 39 of cardboard or the like; such strip being typified by the blank shown in Fig. 11 and there also marked 39 and preferably having score lines as indicated. The other two sections of said blank, marked in Fig. 11 respectively 40a and 41a, are, respectively, the elements 40 and 41 of Figs. 1, 2 and 7.

The flap element 41 as for tucking into the pocket shown in Figs. 6 and 7 between the strip 34 and the adjacent portion of the inner side of the cover-board 17, thereby to stretch taut across the front meeting ends of the hollow structures 20 and 21 the element 40.

The outer surfaces of the portions of said structures 20 and 21 which are exposed to view when the device is expanded may have delineated along the same, that is, in the direction of the perimeter of each such structure 20 or 21, parallel lines in such spacing as to suggest the inter-page spaces of the leaf-stack sought to be simulated; such lines being depicted in Figs. 1–4. As also indicated in these two views, the presence of such lines conceal the meeting lines of the structures 20 and 21 at the top of the device when the latter is arranged as in Fig. 3 or Fig. 4. Similarly, the outer surface of the element 40 may be correspondingly inscribed with page-edge simulating lines, so that when the parts are arranged as last-mentioned, that is, as in Fig. 3 or Fig. 4, there will be a particularly faithful simulation of the leaf-stack of the book. As further indicated in Figs. 3 and 4, the edge line indicating the rear surface of the element 40 when arranged as now being described, will be unnoticeable.

Figure 1:
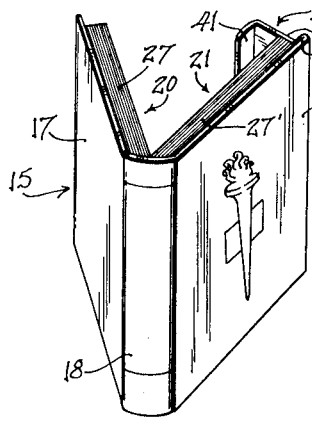
Fig. 1 is a perspective view showing a now favored form of the invention, for simulating an actual book, in magnified size, with the collapsible device of the invention as erected and as though on display while positioned to have its back-binding, this sometimes called in the bookbinders' trade, its spine, facing an observer, and with the book partly open.
Figure 2:
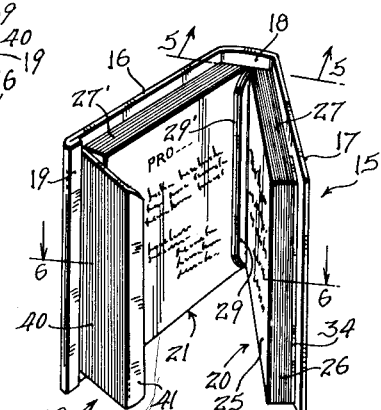
Fig. 2 is a view like Fig. 1, but showing the appearance of the book-replica with its partially opened page-pile facing the observer.
Figure 3:
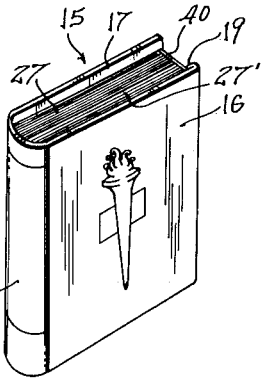
Figs. 3 and 4 are views respectively corresponding to Figs. 1 and 2, but with the book-replica fully closed.
Figure 4:
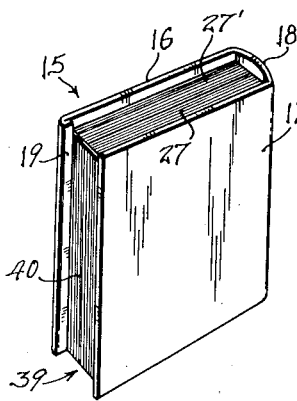

With the display device set up as in Fig. 1 or 2, the part thereof to be afforded by the blank 39 may be omitted, or this part may be allowed to extend as shown in these views, suggesting a temporarily swung out permanently carried bookmark instrumentality in the actual book simulated.

Referring next particularly to Figs. 12 and 13, and in that connection again also to Fig. 10, the subdivision 18a of the blank 22 (this, as will be recalled, to provide the spine or back-binding 18 of the cover 15 of the display device) may be predisposed to a lateral arching such as shown in Fig. 1 when the device is expanded, by use of auxiliary parts to be supplied at nominal expense with the device. These parts need merely comprise one or more very thin strips 42 of resilient material, as metal or a plastic, and, for anchoring the opposite ends of each such strip, and thereby to improve on the same a suitable degree of longitudinal arching, two small pieces 43 of so-called Scotch tape or the like. These parts may conveniently be added just before or incidental to expansion of the device from its stored collapsed condition to its erected condition.

Referring to Fig. 14, here is illustrated a single main blank which may be employed, in lieu of the three main blanks aforesaid, for providing the display device of Figs. 1–7. The subdivisions of this blank of Fig. 14 which correspond, respectively, to the blank 22 of Fig. 8, the blank 23 of Fig. 9, and the aforesaid duplicate of the last-named blank, are, in Fig. 14, respectively designated 22', 23' and 23".

In other respects this form of the invention is similar to the previous forms and like reference numerals are used throughout to identify like parts.

In Fig. 15 there is illustrated a single blank 23" which can be used for forming the two hollow structures of the form of the invention in Figs. 1 to 13. This single blank is a composite of the two blanks used for forming the two hollow structures in that previous form of the invention. The wall elements 29" and 29''', which correspond respectively to the wall elements 29 and 29' of that previous form of the invention, are integral along their adjacent edges and are arranged to be folded forwardly into facial contact along a fold line 50. When folded forwardly the wall elements 29" and 29''' are to be secured together in facial contact by application of glue between the adjacent faces of the wall elements to form the center portion shown in Figs. 2, 5 and 6.

In other respects the form of the invention shown in Fig. 15 is similar to the previous forms and like reference numerals identify like parts in each of the several views.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A book display device, comprising a one-piece cover blank folded to form an elongated center spine and front and back cover-boards on opposite sides of said center spine, separate hollow structures on the inner faces of said front and back cover-boards to simulate stacks of book leaves, said hollow structures each being of a thickness corresponding to one-half the width of said spine to meet in facial contact when said cover-boards are closed toward one another, flaps on the adjacent edges of said hollow structures which engage the center line of said spine in the closed position of said cover-boards, said flaps being extended in facial contact between the adjacent faces of said hollow structures and secured together, and means on the inner face of said spine arching said spine slightly outward in the closed position of said cover-boards.

2. A book display device, comprising a one-piece cover blank folded to form an elongated center spine and front and back cover-boards on opposite sides of said center spine, separate hollow structures on the inner faces of said front and back cover-boards to simulate stacks of book leaves, said hollow structures each being of a thickness corresponding to one-half the width of said spine to meet in facial contact when said cover-boards are closed toward one another, flaps on the adjacent edges of said hollow structures which engage the center line of said spine in the closed position of said cover-boards, said flaps being extended in facial contact between the adjacent faces of said hollow structures and secured together, and means on the inner face of said spine arching said spine slightly outward in the closed position of said cover-boards, said arching means comprising short elongated arcuate resilient strips extended laterally across the inner face of said spine adjacent the ends thereof, said strips being positioned with their concave sides facing outward, and means securing said strips in position.

3. A book display device, comprising a one-piece cover blank folded to form an elongated center spine and front and back cover-boards on opposite sides of said center spine, separate hollow structures on the inner faces of said front and back cover-boards to simulate stacks of book leaves, said hollow structures each being of a thickness corresponding to one-half the width of said spine to meet in facial contact when said cover-boards are closed toward one another, flaps on the adjacent edges of said hollow structures which engage the center line of said spine in the closed position of said cover-boards, said flaps being extended in facial contact between the adjacent faces of said hollow structures and secured together, and means on the inner face of said spine arching said spine slightly outward in the closed position of said cover-boards, an elongated strip secured along one longitudinal edge to the free edge of one of said cover-boards opposite said spine, said elongated strip having a width corresponding to the combined thickness of said hollow structures, and a flap element formed along the other longitudinal edge of said strip for insertion in the closed position of said cover-boards between the adjacent faces of the other of said cover-boards and its respective hollow structure for holding said cover-boards in their closed position, said strip being of a length corresponding to the length of said hollow structures to extend over and hide the meeting edges of said hollow structures at the free edges of said cover-boards opposite said spine.

IRVING POLITZER.

REFERENCES CITED

The following references are of record in the file of this patent:

UNITED STATES PATENTS

| Number | Name | Date |
| --- | --- | --- |
| 1,445,593 | Iscowitz | Feb. 13, 1923 |
| 1,866,323 | Russell | July 5, 1932 |
| 2,061,992 | Wilson | Nov. 24, 1936 |
| 2,080,938 | Storch | May 18, 1937 |
| 2,387,790 | Williamson | Oct. 30, 1945 |